(12) United States Patent
Kanamaru

(10) Patent No.: US 9,380,173 B2
(45) Date of Patent: Jun. 28, 2016

(54) INFORMATION PROCESSING APPARATUS AND COMPUTER-READABLE NON-TRANSITORY RECORDING MEDIUM WITH IMAGE PROCESSING PROGRAM STORED THEREON

(71) Applicant: KYOCERA Document Solutions Inc., Osaka (JP)

(72) Inventor: Kazuhiro Kanamaru, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 14/735,554

(22) Filed: Jun. 10, 2015

(65) Prior Publication Data

US 2015/0363679 A1 Dec. 17, 2015

(30) Foreign Application Priority Data

Jun. 11, 2014 (JP) ................................ 2014-120857

(51) Int. Cl.
*G06F 3/12* (2006.01)
*G06K 15/00* (2006.01)
*H04N 1/00* (2006.01)

(52) U.S. Cl.
CPC ....................................... *H04N 1/00* (2013.01)

(58) Field of Classification Search
None
See application file for complete search history.

(56) References Cited

U.S. PATENT DOCUMENTS

| 2003/0084055 A1* | 5/2003 | Tanaka | G06F 17/248 |
| 2011/0188773 A1* | 8/2011 | Wei | G06K 9/40 382/260 |
| 2012/0069397 A1* | 3/2012 | Bury | B41J 3/50 358/1.15 |
| 2012/0259727 A1* | 10/2012 | Fermin | G06Q 30/00 705/26.5 |
| 2014/0368869 A1* | 12/2014 | Park | G06F 3/125 358/1.15 |

FOREIGN PATENT DOCUMENTS

JP 2005-354331 A 12/2005

OTHER PUBLICATIONS

Aspect Ratio Calculator https://web.archive.org/web/20130613141654/http://andrew.hedges.name/experiments/aspect_ratio (2013).*

* cited by examiner

*Primary Examiner* — Huo Long Chen

(57) ABSTRACT

An information processing apparatus includes: an image data acquisition section configured to acquire image data; an output target image specifying section configured to specify, from the image data, an output target image to be output; an image size calculating section configured to calculate an image size of the output target image based on a magnitude of a region where the output target image exists in the acquired image data; an actual size acquisition section configured to acquire, from the acquired image data, actual size information indicating an actual size of the output target image; a ratio calculating section configured to calculate a ratio of the calculated image size to the actual size indicated by the actual size information; an image processing section configured to enlarge or reduce the output target image according to the calculated ratio; and an output section configured to output the enlarged or reduced output target image.

2 Claims, 7 Drawing Sheets

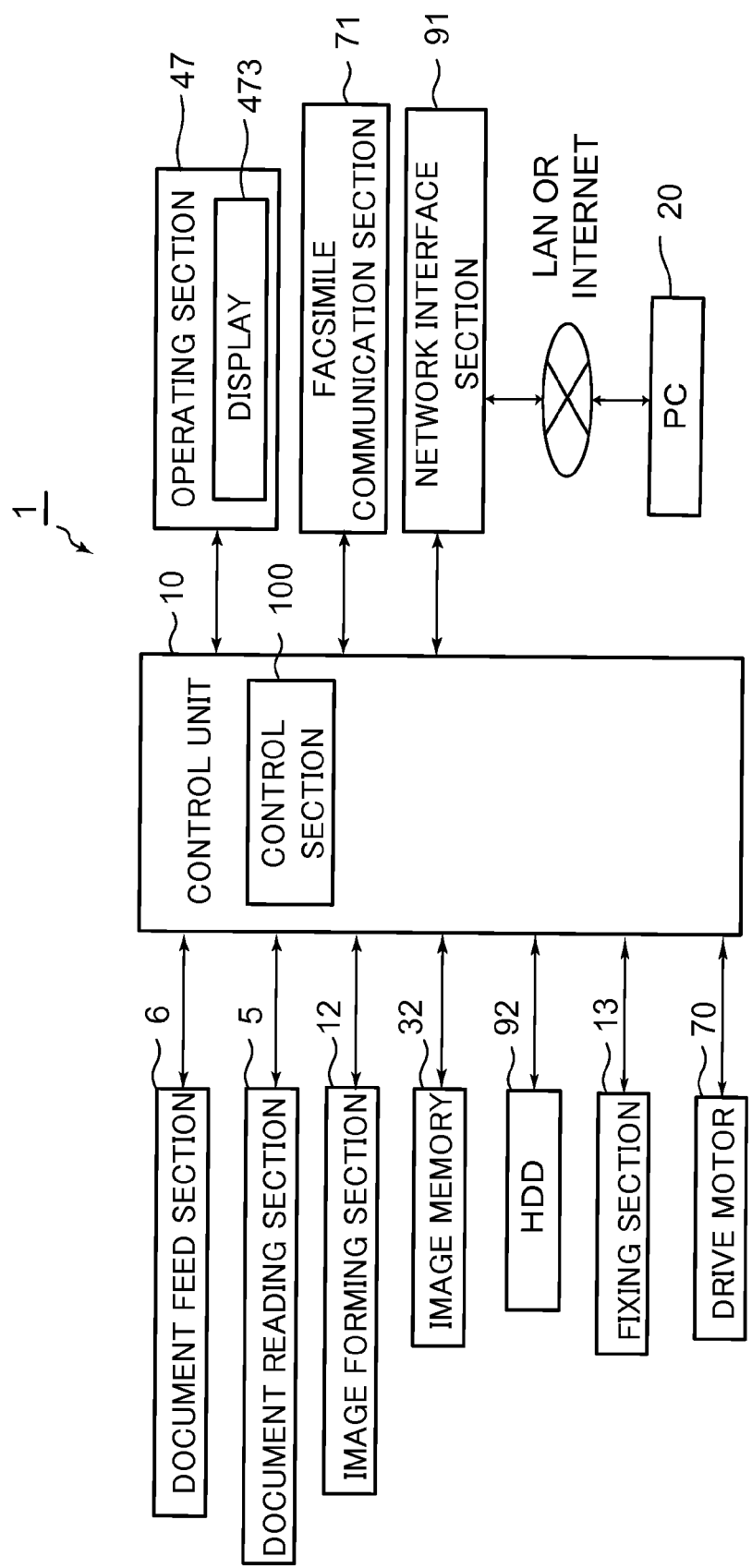

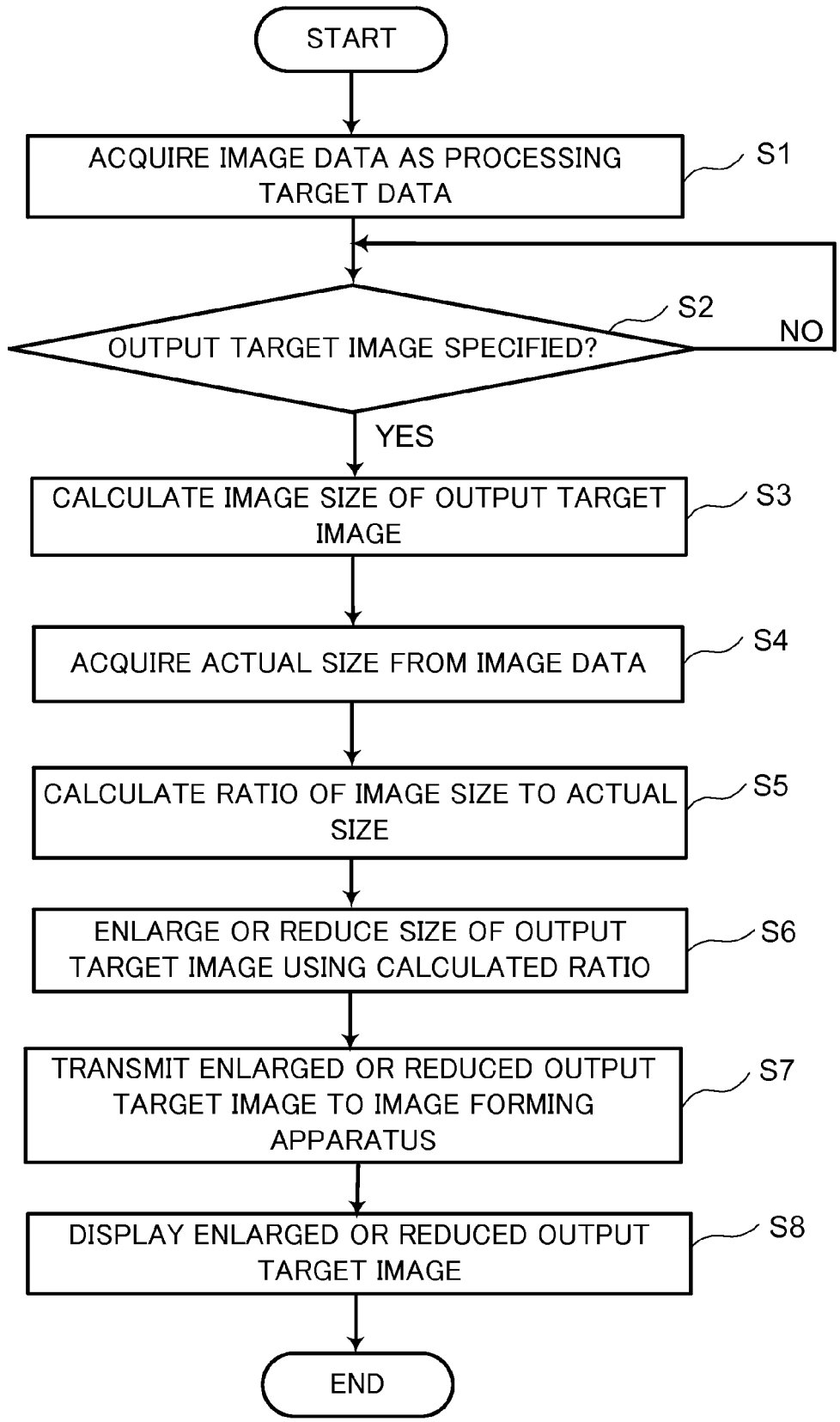

ENLARGED OUTPUT
TARGET IMAGE

IMAGE DATA

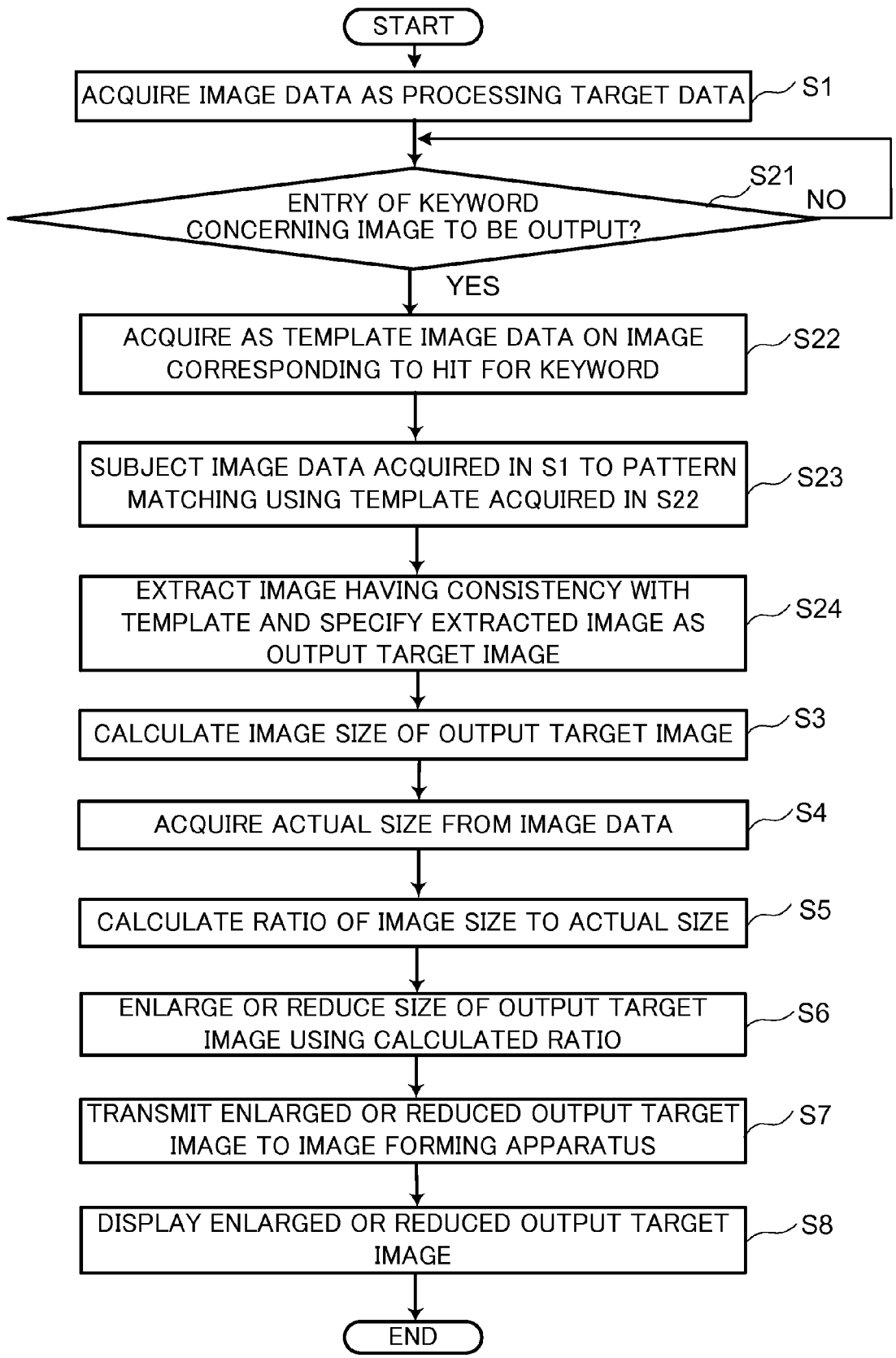

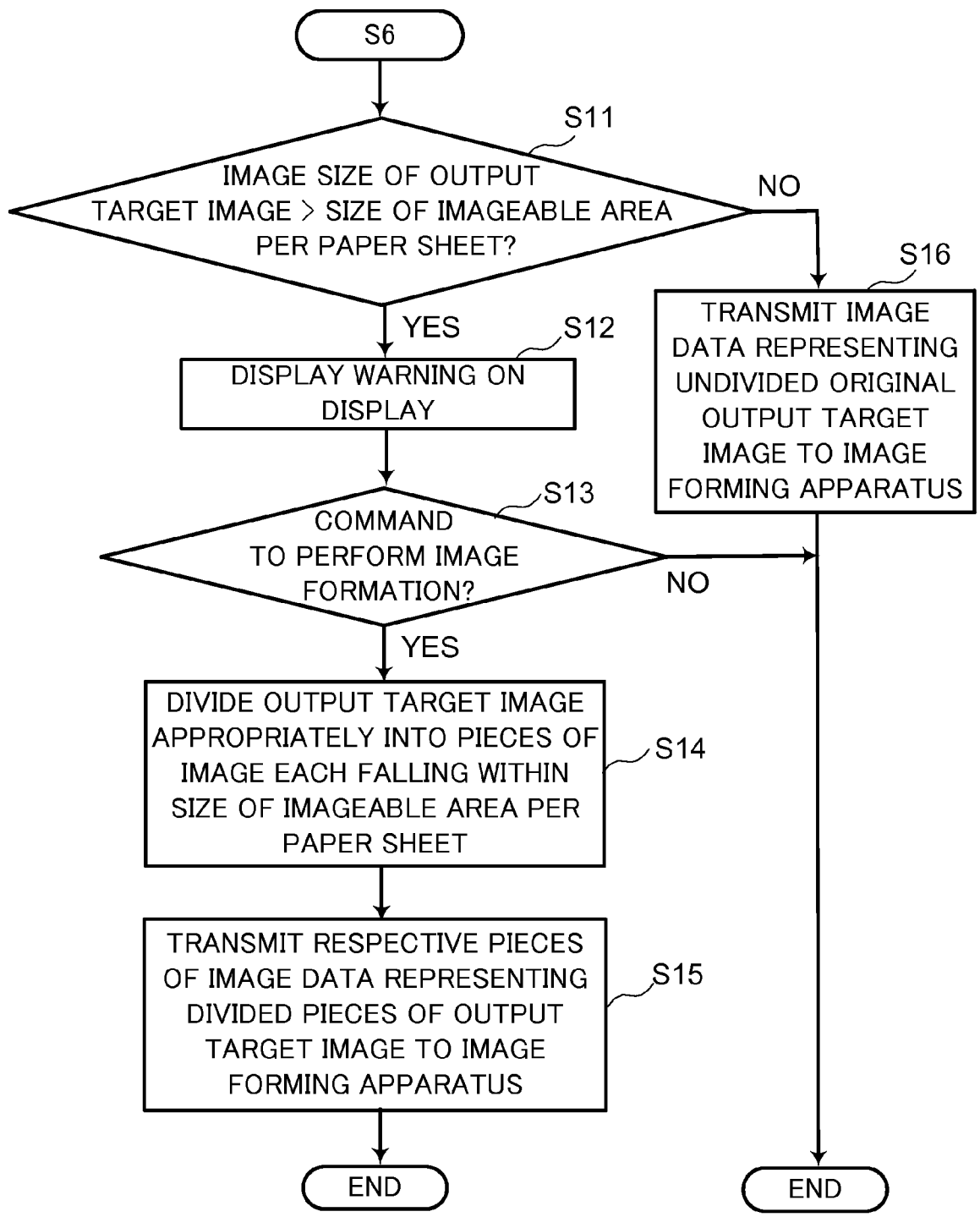

US 9,380,173 B2

INFORMATION PROCESSING APPARATUS AND COMPUTER-READABLE NON-TRANSITORY RECORDING MEDIUM WITH IMAGE PROCESSING PROGRAM STORED THEREON

INCORPORATION BY REFERENCE

This application claims priority to Japanese Patent Application No. 2014-120857 filed on Jun. 11, 2014, the entire contents of which are incorporated by reference herein.

BACKGROUND

The present disclosure relates to information processing apparatuses and image processing programs for performing image processing.

For example, an image output apparatus is known which is capable of printing a subject in an image in the actual size of the subject. This image output apparatus is configured to acquire information on the actual size of a subject and information on the image size of the subject, calculate a printing magnification of the subject based on the information on the actual size and the information on the image size so that the printed size of the subject approximately coincides with the actual size thereof, and print a captured image of the subject at the calculated printing magnification. This image output apparatus acquires the information on the image size of the subject by calculating the image size of the subject from an attribute signal representing a focal length and an attribute signal representing a subject distance both obtained by photography.

SUMMARY

A technique improved over the above technique is proposed as one aspect of the present disclosure. An information processing apparatus according to an aspect of the present disclosure includes an image data acquisition section, an output target image specifying section, an image size calculating section, an actual size acquisition section, a ratio calculating section, an image processing section, and an output section. The image data acquisition section is configured to acquire image data. The output target image specifying section is configured to specify, from the image data acquired by the image data acquisition section, an output target image to be output. The image size calculating section is configured to calculate an image size of the output target image based on a magnitude of a region where the output target image exists in the acquired image data. The actual size acquisition section is configured to acquire, from the acquired image data, actual size information indicating an actual size of the output target image. The ratio calculating section is configured to calculate a ratio of the calculated image size to the actual size indicated by the actual size information acquired by the actual size acquisition section. The image processing section is configured to enlarge or reduce the image size of the output target image according to the ratio calculated by the ratio calculating section. The output section is configured to output the output target image enlarged or reduced by the image processing section.

A computer-readable non-transitory recording medium according to another aspect of the present disclosure stores an image processing program. The image processing program allows a computer to function as the image data acquisition section, the output target image specifying section, the image size calculating section, the actual size acquisition section, the ratio calculating section, and the image processing section.

BRIEF DESCRIPTION OF THE DRAWINGS

FIG. 3 is a functional block diagram showing an essential internal configuration of an image forming apparatus.

FIG. 4 is a flowchart showing a first embodiment of image processing by an image processing system including the information processing apparatus according to the first embodiment of the present disclosure.

FIG. 6 is a flowchart showing a second embodiment of image processing by an image processing system including an information processing apparatus according to a second embodiment of the present disclosure.

FIG. 7 is a flowchart showing a third embodiment of image processing by an image processing system including an information processing apparatus according to a third embodiment of the present disclosure.

DETAILED DESCRIPTION

Figure 1:
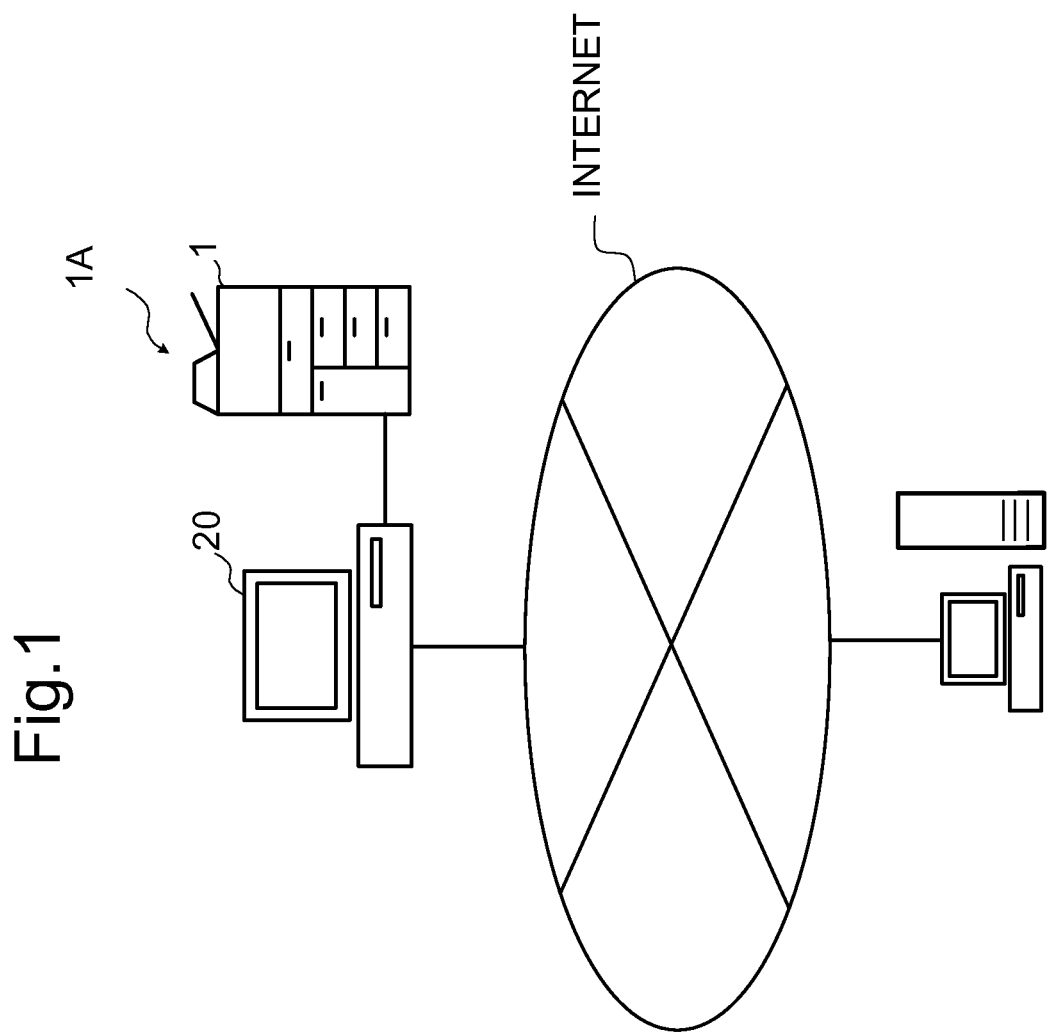
FIG. 1 is a configuration diagram of an entire system including an information processing apparatus according to a first embodiment of the present disclosure.

Hereinafter, a description will be given of an information processing apparatus and an image processing program, both according to a first embodiment of the present disclosure, with reference to the drawings. FIG. 1 is a configuration diagram of an entire image processing system including the information processing apparatus according to the first embodiment of the present disclosure.

The image processing system 1A includes an image forming apparatus 1 and a computer 20. The image forming apparatus 1 and the computer 20 are connected to each other via a LAN (local area network) or the like. The computer 20 serves as an example of an information processing apparatus defined in claims.

Figure 2:
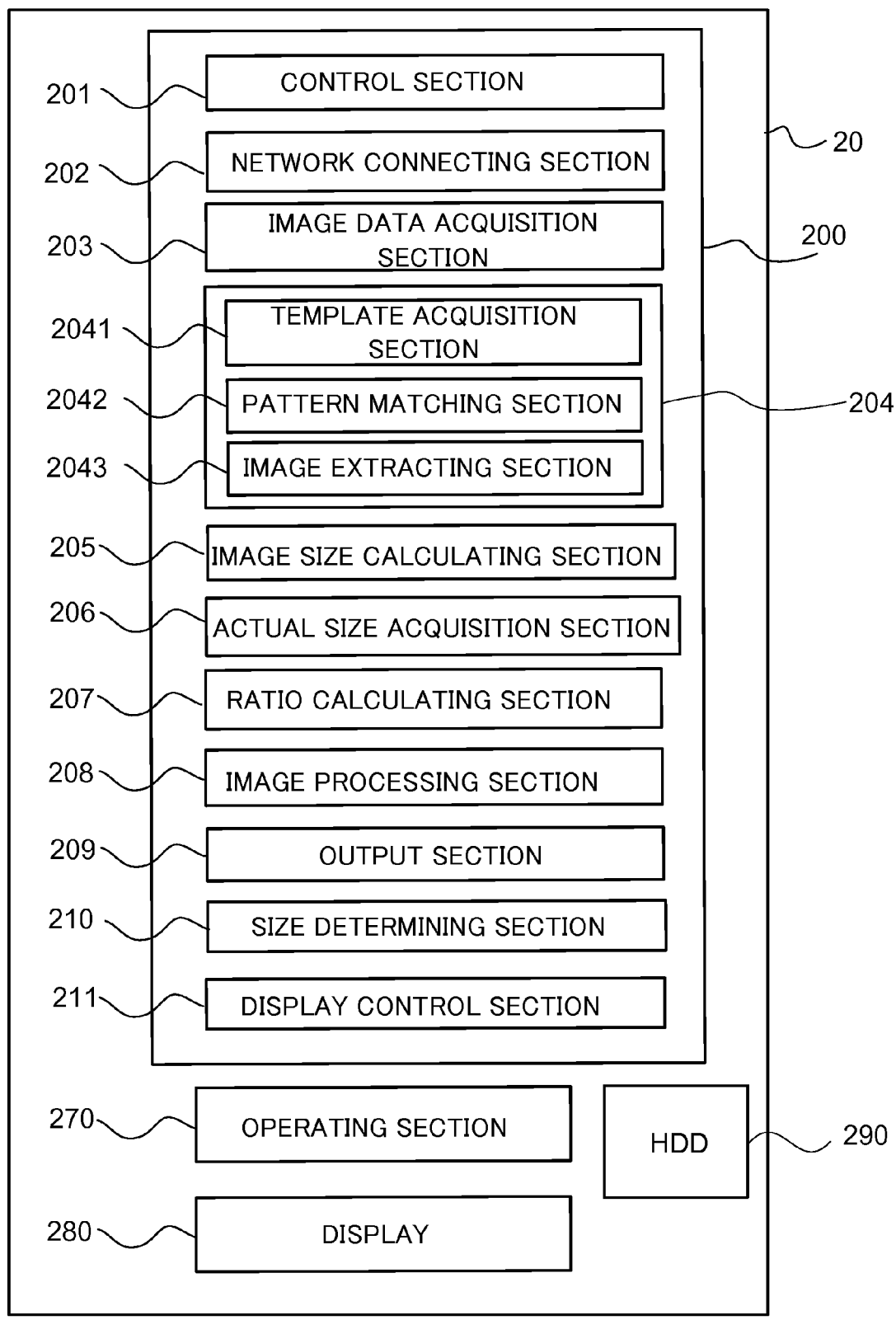
FIG. 2 is a functional block diagram showing an essential internal configuration of a computer.

FIG. 2 is a functional block diagram showing an essential internal configuration of the computer 20. The computer 20 includes a control unit 200, an operating section 270, a display 280, and an HDD 290. The control unit 200 is composed of a CPU (central processing unit), a RAM, a ROM, and so on. The control unit 200 includes, a control section 201, a network connecting section 202, an image data acquisition section 203, an output target image specifying section 204, an image size calculating section 205, an actual size acquisition section 206, a ratio calculating section 207, an image processing section 208, an output section 209, a size determining section 210, and a display control section 211.

The control section 201 governs the overall operation control of the computer 20. The control section 201 serves as an example of a control section defined in claims.

The network connecting section 202 is configured to connect the computer 20 to the Internet.

The image data acquisition section 203 is configured to acquire image data as print target data through the network connecting section 202 from an Internet site or acquire as print target data image data stored on the HDD 290.

The output target image specifying section 204 is configured to specify, from among images contained in the image data acquired by the image data acquisition section 203, an output target image to be output. The output target image specifying section 204 includes a template acquisition section 2041, a pattern matching section 2042, and an image extracting section 2043.

The template acquisition section 2041 is configured to receive a keyword entered through the operating section 270 from a user and acquire through a computer network a template for use to extract the output target image from among the images contained in the acquired image data.

The pattern matching section 2042 is configured to subject the image data acquired by the image data acquisition section 203 to pattern matching using the template acquired by the template acquisition section 2041.

The image extracting section 2043 is configured to extract an image determined to have a consistency with the template by the pattern matching of the pattern matching section 2042 and specify the extracted image as the output target image.

The image size calculating section 205 is configured to calculate the image size of the output target image based on the magnitude of a region where the output target image exists in the image data acquired by the image data acquisition section 203. For example, the image size calculating section 205 calculates the image size (width and height) of the output target image based on the magnitude of a region where the output target image occupies in an entire image represented by the acquired image data (for example, the region is indicated by an xy coordinate system).

The actual size acquisition section 206 is configured to acquire, from the acquired image data, actual size information indicating the actual size of the output target image. For example, if the image represented by the acquired image data represents a catalog, the actual size acquisition section 206 searches for predetermined size-related words, including "size", "width", "height", and "depth", contained in the catalog and extracts and acquires, as actual size information, characters situated next to each of the above words and indicated by a combination of numerals and a unit symbol. If the acquired image data is jpeg, PDF, or like image data, the actual size acquisition section 206 converts the image data into characters using an internal OCR function and then performs the above extraction by string search. If the acquired data is data created using a word-processing program or text data, the actual size acquisition section 206 performs the above extraction by string search.

The ratio calculating section 207 is configured to calculate the ratio of the image size calculated by the image size calculating section 205 to the actual size indicated by the actual size information acquired by the actual size acquisition section 206.

The image processing section 208 is configured to enlarge or reduce the image size of the output target image extracted by the image extracting section 2043, according to the ratio calculated by the ratio calculating section 207.

The output section 209 is configured to output the output target image enlarged or reduced in size by the image processing section 208. For example, the output section 209 transmits the output target image enlarged or reduced in size by the image processing section 208 to the image forming apparatus 1 connected to the computer 20.

The size determining section 210 is configured to determine whether the image size of the output target image exceeds the size of an imageable area per single paper sheet for use as a recording medium for image formation on the image forming apparatus 1. The size determining section 210 previously stores size information on different imageable areas for different sized paper sheets, including A4, A3, B5, and B4, preset in the image forming apparatus 1.

The display control section 211 is configured to, when the size determining section 210 determines that the image size of the output target image exceeds the size of the imageable area per single paper sheet, allow the display 280 to display (notify of) a warning message indicating that the image size will exceed the size of the imageable area. The display 280 serves as an example of a notifying section defined in claims.

The operating section 270 includes a keyboard, a mouse or a touch panel through which a user enters a print command specifying print target data and the image forming apparatus 1 for use in printing or other commands. The operating section 270 receives from the user an entry of the aforementioned keyword for use to search for and acquire a template. The operating section 270 serves as an example of a command receiving section defined in claims.

The display 280 is formed of an LCD (liquid crystal display) or the like and configured to display warning messages, operation guidance, and so on for the user.

FIG. 3 is a functional block diagram showing an essential internal configuration of the image forming apparatus 1. The image forming apparatus 1 includes a control unit 10, an operating section 47, a document feed section 6, a document reading section 5, an image forming section 12, a fixing section 13, an image memory 32, a drive motor 70, a facsimile communication section 71, a network interface section 91, an HDD 92, and so on.

The operating section 47 includes a touch panel and is configured to receive operator's commands for various types of operations and processing executable by the image forming apparatus 1. The operating section 47 includes a display 473 configured to display operation guidance and so on for the operator. The display 473 serves as an example of a display as defined in claims.

In a document reading operation of the image forming apparatus 1, the document reading section 5 optically reads an image of an original document being fed by the document feed section 6 to generate image data. The image data generated by the document reading section 5 is stored on an internal HDD, a network-connected computer or the like.

The document reading section 5 is under the control of the control unit 10 and includes a scanning mechanism including a lighting part, a CCD sensor, and so on. The document reading section 5 is configured to read a document image from an original document by irradiating the original document with light from the lighting part and receiving the reflected light on the CCD sensor.

In an image forming operation of the image forming apparatus 1, the image forming section 12 forms a toner image on a printing paper sheet serving as a recording medium fed from an unshown sheet feed section, based on image data generated by the document reading operation, image data received from a network-connected computer, or image data stored on the internal HDD. The fixing section 13 is configured to fix the toner image on the printing paper sheet by the application of heat and pressure.

The image memory 32 provides a region for use in temporarily storing data of the document image acquired by reading by the document reading section 5 or temporarily saving data to be printed by the image forming section 12.

The drive motor 70 is a drive source for applying a rotary drive force to various rotary members of the image forming section 12, an unshown conveyance roller, and other rotary members.

The facsimile communication section 71 includes a coding/decoding section, a modulation/demodulation section, and an NCU (network control unit), all of which are not illustrated, and performs facsimile communication using a public telephone network.

The network interface section 91 is constituted by a communication module, such as a LAN board, and transfers various data to and from the computers 20 and the like in a local area or on the Internet via a LAN or the like connected to the network interface section 91.

The HDD 92 is a large storage device capable of storing the document image read by the document reading section 5 or like image.

The control unit 10 is composed of a CPU, a RAM, a ROM, a dedicated hardware circuit, and so on and governs the overall operation control of the image forming apparatus 1. The control unit 10 includes a control section 100.

The control section 100 is connected to the operating section 47, the document feed section 6, the document reading section 5, the image memory 32, the image forming section 12, the fixing section 13, the drive motor 70, the facsimile communication section 71, the network interface section 91, the HDD 92, and so on and controls the operations of these components.

The control unit 10 functions as the control section 100 based on operations in accordance with an image processing program installed on the HDD 92. However, the control section 100 may not depend upon the operations of the control unit 10 in accordance with the image processing program and can be constituted by a hardware circuit. Hereinafter, the same applies to the other embodiments unless otherwise stated.

Next, a description will be given of a first embodiment of image processing by the image processing system including the information processing apparatus according to the embodiment of the present disclosure with reference to FIG. 4. FIG. 4 is a flowchart showing the first embodiment of image processing by the image processing system including the information processing apparatus according to the embodiment of the present disclosure.

Figure 5B:
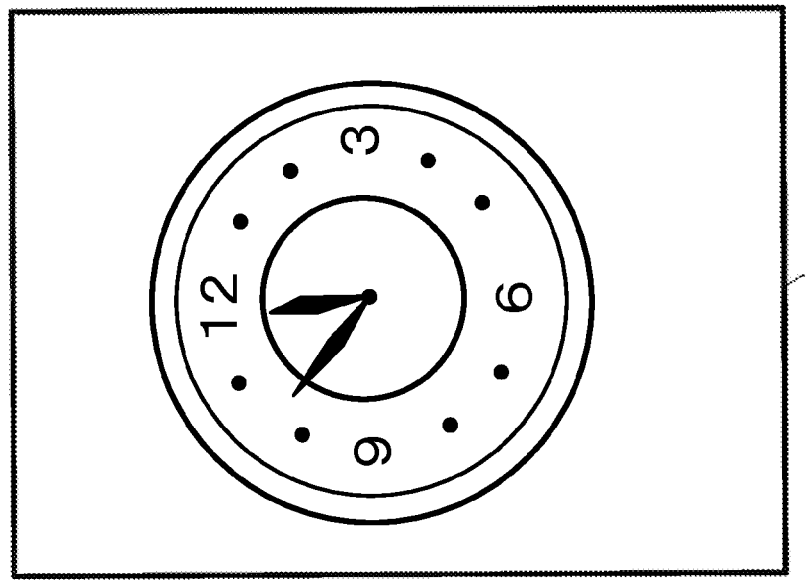
FIGS. 5A and 5B are views showing display contents on the computer side.
Figure 5A:
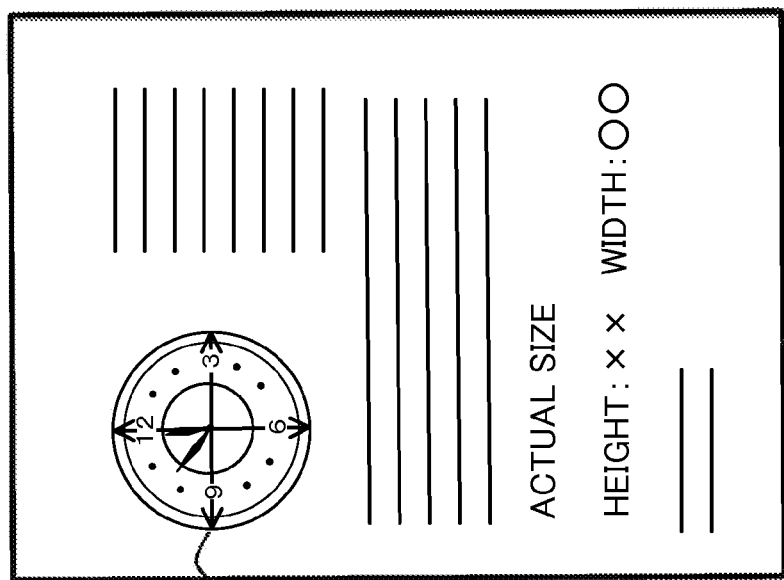

When an operator enters through the operating section 270 a command to acquire image data as print target data, for example, a command specifying a URL to allow the display 280 to display the URL, the image data acquisition section 203 acquires, as the print target data, image data forming a web page from an Internet site indicated by the URL (S1) and the display control section 211 allows the display 280 to display an entire image represented by the image data, for example, in a manner illustrated in FIG. 5A. In this example, the displayed entire image represented by the image data includes an image of a clock and actual size information located below the image of the clock and indicating the actual size (height and width) of the clock.

Then, when the operator operates a mouse serving as the operating section 270 to specify a partial image region in the entire image represented by the image data and displayed on the display screen of the display 280, the output target image specifying section 204 specifies the specified image region, i.e., the image of the clock, as an output target image (YES in S2). For example, the operator may use the mouse to specify as an output target image a desired one of all the images represented by the image data, such as by dragging the mouse along a diagonal line of a rectangular region which can enclose the desired image which he/she wants to specify as the output target image.

If the operator does not specify any partial image region, the output target image specifying section 204 stands by for an operator's entry of a specification of a partial image region (NO in S2). Subsequently, the image size calculating section 205 calculates the image size of the output target image based on the magnitude of the region which has been specified in S2 and where the output target image exists in the image data acquired by the image data acquisition section 203 in S1 (S3).

The actual size acquisition section 206 acquires, from the image data acquired in S1, actual size information indicating the actual size of the output target image specified in S2 (S4). Instead of this method for acquiring the actual size, the actual size acquisition section 206 may acquire, as actual size information, values entered by an operator's operation of the operating section 270.

Then, the ratio calculating section 207 calculates the ratio of the image size calculated by the image size calculating section 205 in S3 to the actual size indicated by the actual size information acquired by the actual size acquisition section 206 in S4 (S5).

The image processing section 208 enlarges or reduces the output target image specified in S2, according to the ratio calculated in S5 (S6).

The output section 209 transmits via the network connecting section 202 to the image forming apparatus 1 the output target image enlarged or reduced in size by the image processing section 208 (S7). Furthermore, the display control section 211 allows the display 280 to display the enlarged or reduced output target image, for example, in a manner shown in FIG. 5B (S8). Specifically, the output section 209 transmits to the image forming apparatus 1 image data representing an image enlarged or reduced from the output target image to a size indicated by size information, while the display control section 211 allows the display 280 to display the enlarged or reduced image.

For example, in the conventional technique of acquiring image size information based on pieces of attribute information, including a focal length and a subject distance, these pieces of attribute information cannot be acquired unless an image of the subject is taken by a camera. In this conventional technique, any subject in an image in which neither focal length nor subject distance is known cannot be printed in its actual size.

Unlike the above conventional technique, since, in this embodiment, the image size calculating section 205 performs the calculation of the image size of the output target image in the above manner and the actual size acquisition section 206 acquires the actual size in the above manner, the output target image can be enlarged or reduced to actual size without the need to acquire the focal length and the subject distance which would be needed in the conventional technique. As described previously, in this embodiment, so long as the acquired image data contains actual size information indicating the actual size of the output target image, image data representing the output target image in actual size can be transmitted from the output section 209 to the image forming apparatus 1. Thus, the image forming apparatus 1 can use the transmitted image data to form the output target image enlarged or reduced to actual size.

Hence, in this embodiment, the output target image in the image data can be output in the actual size indicated by the actual size information, i.e., displayed or formed in the actual size indicated by the actual size information, without the need for special information, such as a focal length and a subject distance, which would be needed in the conventional technique.

Next, a description will be given of a second embodiment of image processing by an image processing system including an information processing apparatus according to a second embodiment of the present disclosure. FIG. 6 is a flowchart showing the second embodiment of image processing by the image processing system including the information processing apparatus according to the second embodiment of the present disclosure. Further diagrammatic representation and explanation of the same processing steps as those in the first embodiment will not be given.

In the second embodiment, instead of the processing step in S2 in the first embodiment, the following steps are performed as processing steps for specifying an output target image.

After the operator acquires image data to be output from an Internet site via a browser or the like installed on the computer 20 (S1), he/she enters a keyword concerning an image that he/she wants to output (for example, if the operator wants to output an image of a clock, he/she enters the word "clock", "watch", "wristwatch", "chronograph" or the like) (S21).

When the operator enters the keyword (YES in S21), the template acquisition section 2041 serving as the output target image specifying section 204 searches Internet sites through the network connecting section 202 for a web page containing an image concerning the keyword and acquires, as a template, image data on an image corresponding to a hit for the keyword from among images constituting the web page extracted by the searching (S22).

Then, the pattern matching section 2042 subjects the image data acquired in S1 to pattern matching using the temperate acquired in S22 (S23). The image extracting section 2043 extracts an image determined to have a consistency with the template by the pattern matching of the pattern matching section 2042 and specifies the extracted image as an output target image (S24). Subsequently, the same processing steps as S3 and later steps in the first embodiment shown in FIG. 4 are executed.

In the second embodiment, even in the case where the operator has not accurately known which of all the images represented by the image data acquired in S1 is an output target image representing an article that he/she wants to output in actual size and, therefore, the operator himself/herself cannot specify the output target image from among the images represented by the image data acquired in S1, it is possible to accurately extract, from among the images represented by the image data acquired in S1, the output target image representing the article that the operator wants to output in actual size.

If, in S22 in the second embodiment, the template acquisition section 2041 serving as the output target image acquisition section 204 has acquired a plurality of images as templates, the display control section 211 may allow the display 280 to display the plurality of images and the operator may specify one of the images by the operation of the operating section 270 to use it for the pattern matching in S23.

Next, a description will be given of a third embodiment of image processing by an image processing system including an information processing apparatus according to a third embodiment of the present disclosure. FIG. 7 is a flowchart showing the third embodiment of image processing by the image processing system including the information processing apparatus according to the third embodiment of the present disclosure. Further diagrammatic representation and explanation of the same processing steps as those in the first or second embodiment will not be given.

In the third embodiment, after the processing steps S1 to S6 are executed in the same manner as in the first or second embodiment, the size determining section 210 determines whether the image size of the output target image enlarged or reduced in S6 exceeds the size of an imageable area per single paper sheet for use in image formation on the image forming apparatus 1 (S11).

When the size determining section 210 determines that the image size of the output target image exceeds the size of the imageable area (YES in S11), the display control section 211 allows the display 280 to display a warning message indicating that the image size will exceed the size of the imageable area (S12).

At this time, the control section 201 determines whether to have received a command to perform an image forming operation through the operating section 270 from the operator (S13). When the control section 201 determines that a command to perform an image forming operation has been entered on the operating section 270 (YES in S13), the control section 201 divides the output target image appropriately into pieces of image each falling within the size of the imageable area per single paper sheet for use in image formation on the image forming apparatus 1 (S14) and the output section 209 transmits respective pieces of image data representing the divided pieces of output target image to the image forming apparatus 1 (S15). On the other hand, if the operating section 270 has received an entry of a command to stop an image forming operation (NO in S13), it ends the processing.

If in S11 the size determining section 210 determines that the image size of the output target image does not exceed the size of the imageable area (NO in S11), the output section 209 transmits image data representing the undivided, original output target image to the image forming apparatus 1 (S16).

In the third embodiment, in the case where the output target image enlarged or reduced in size based on the actual size indicated by the actual size information is beyond the size of the imageable area per single paper sheet for use in image formation on the image forming apparatus 1, the operator can be notified of this situation by a warning message displayed on the display 280.

Furthermore, when during the display of such a warning message the operator enters a command to perform printing, image data representing the output target image is divided into pieces of image data each falling within the size of the imageable area per single paper sheet for use in image formation on the image forming apparatus 1 and the divided pieces of image data are transmitted to the image forming apparatus 1. Thus, the image forming apparatus 1 can perform the image formation based on each of the divided pieces of image data. Therefore, even in the case where the entire output target image cannot be formed on a single paper sheet for use in the image forming apparatus 1, the operator can know the output target image formed in actual size based on the actual size information and the actual size by putting together the paper sheets on which the divided pieces of output target image are formed.

The aforementioned computer 20 may be an image forming apparatus. In this case, the output section defined in claims may be the network interface section 91 configured to output data to an apparatus having a touch panel function or an image forming section 12 configured to form an output target image enlarged or reduced to actual size. Furthermore, the computer 20 may be a tablet terminal, a smartphone or the like.

In the above embodiments, the description has been given of the example where the image size calculating section 205 calculates the image size (width and height) of an output target image based on the magnitude of a region where the output target image occupies in the entire image represented by the acquired image data (for example, the region is indicated by an xy coordinate system) and the actual size acquisition section 206 acquires from the image data the actual size (width and height) indicated by the actual size information on the output target image. However, the present disclosure is not limited to this example. For example, the actual size acquisition section 206 may acquire, from the image data, actual size information indicating actual three dimensions of the output target image including the width, height, and depth thereof, the ratio calculating section 207 may use the actual three dimensions to calculate the ratio of the image size to the actual size based on a three-dimensional coordinate system having an x axis representing the width of the output target image, a y axis representing the height thereof, and a z axis representing the depth thereof, and the image processing section 208 may enlarge or reduce the image size of the output target image in the three-dimensional directions. If information acquired on the image size of the output target image is only size information on two of the three dimensions, such as only the width and height, the image processing section 208 can use a predetermined image to create an image portion of the remaining unknown dimension, thus generating a three-dimensional image.

Furthermore, the configurations and processing shown in the above embodiments with reference to FIGS. 1 to 7 are merely illustrative of the present disclosure and not intended to limit the present disclosure to the above particular configurations and processing.

What is claimed is:

1. An information processing apparatus comprising:
   an operating section configured to receive an operator's entry of command;
   an image data acquisition section configured to acquire, from an Internet site, image data represented by a command to acquire the image data as a print target, in which an entry of the command has been received by the operation section;
   an output target image specifying section configured to specify, from the image data acquired by the image data acquisition section, an output target image to be output;
   an image size calculating section configured to calculate an image size of the output target image based on a magnitude of a region where the output target image exists in the acquired image data;
   an actual size acquisition section configured to search, from the image data acquired by the image data acquisition, for predetermined size-related word, extract characters situated next to the word and indicated by a combination of numerals and unit symbol, and acquire the extracted characters as actual size information indicating an actual size of the output target image;
   a ratio calculating section configured to calculate a ratio of the calculated image size to the actual size indicated by the actual size information acquired by the actual size acquisition section;
   an image processing section configured to enlarge or reduce the image size of the output target image according to the ratio calculated by the ratio calculating section; and
   an output section configured to output the output target image enlarged or reduced by the image processing section,
   wherein the output target image specifying section comprises:
   a template acquisition section configured to acquire, from a web page on Internet, an image concerning a keyword as a template for use to extract the output target image, in which an entry of the keyword has been received by the operation section;
   a pattern matching section configured to subject the image data acquired by the image data acquisition section to pattern matching using the template; and
   an image extracting section configured to extract an image determined to have a consistency with the template by the pattern matching of the pattern matching section and specify the extracted image as the output target image, and
   the actual size acquisition section is further configured to acquire as the actual size information pieces of actual size information on dimensions of the output target image in width, height, and depth directions, and
   the image processing section is further configured to enlarge or reduce the output target image in the width, height, and depth directions and, in the absence of the piece of actual size information on the dimension in one of the width, height, and depth directions, use a predetermined image to create a portion of the output target image in the one direction in which the piece of actual size information on the dimension is absent.

2. A computer-readable non-transitory recording medium with an image processing program stored thereon, the image processing program allowing a computer to function as:
   an image data acquisition section configured to acquire, from an Internet site, image data represented by a command to acquire the image data as a print target, in which an entry of the command has been received by the operation section;
   an output target image specifying section configured to specify, from the image data acquired by the image data acquisition section, an output target image to be output;
   an image size calculating section configured to calculate an image size of the output target image based on a magnitude of a region where the output target image exists in the acquired image data;
   an actual size acquisition section configured to search, from the image data acquired by the image data acquisition section, for a predetermined size-related word, extract characters situated next to the word and indicated by a combination of numerals and a unit symbol, and acquire the extracted characters as actual size information indicating an actual size of the output target image;
   a ration calculating section configured to calculate a ratio of the calculated image size to the actual size indicated by the actual size information acquired by the actual size acquisition section; and
   an image processing section configured to enlarge or reduce the image size of the output target image according to the ration calculated by the radio calculating section,
   wherein the image processing program allows the computer to further function to allow the output target image specifying section to function as:
   a template acquisition section configured to acquire, from a web page on Internet, an image concerning a keyword as a template for use to extract the output target image, in which an entry of the keyword has been received by the operation section;
   a pattern matching section configured to subject the image data acquired by the image data acquisition section to pattern matching using the template; and
   an image extracting section configured to extract an image determined to have a consistency with the template by the pattern matching of the pattern matching section and specify the extracted image as the output target image, and
   the image processing program allows the computer to further function to allow the actual size acquisition section is configured to acquire as the actual size information pieces of actual size information on dimensions of the output target image in width, height, and depth directions, and the image processing section is configured to enlarge or reduce the output target image in the width, height, and depth directions and, in the absence of the piece of actual size information on the dimension in one of the width, height, and depth directions, use a predetermined image to create a portion of the output target image in the one direction in which the piece of actual size information on the dimension is absent.

\* \* \* \* \*